US012136265B2

(12) United States Patent
Schikora et al.

(10) Patent No.: US 12,136,265 B2
(45) Date of Patent: Nov. 5, 2024

(54) SCOUTING FUNCTIONALITY EMERGENCE

(71) Applicant: BASF Agro Trademarks GmbH, Ludwigshafen am Rein (DE)

(72) Inventors: Marek Piotr Schikora, Cologne (DE); Tim Schaare, Cologne (DE); Joerg Wildt, Cologne (DE); Martin Bender, Cologne (DE)

(73) Assignee: BASF AGRO TRADEMARKS GMBH, Ludwigshafen am Rhein (DE)

( * ) Notice: Subject to any disclaimer, the term of this patent is extended or adjusted under 35 U.S.C. 154(b) by 356 days.

(21) Appl. No.: 17/774,635

(22) PCT Filed: Nov. 6, 2020

(86) PCT No.: PCT/EP2020/081299
§ 371 (c)(1),
(2) Date: May 5, 2022

(87) PCT Pub. No.: WO2021/089785
PCT Pub. Date: May 14, 2021

(65) Prior Publication Data
US 2022/0392214 A1 Dec. 8, 2022

(30) Foreign Application Priority Data
Nov. 8, 2019 (EP) .................................. 19208085

(51) Int. Cl.
*G06K 9/00* (2022.01)
*G06V 10/774* (2022.01)
*G06V 10/82* (2022.01)
*G06V 20/10* (2022.01)
*H04N 5/272* (2006.01)

(52) U.S. Cl.
CPC .......... *G06V 20/188* (2022.01); *G06V 10/774* (2022.01); *G06V 10/82* (2022.01); *H04N 5/272* (2013.01); *G06V 2201/10* (2022.01)

(58) Field of Classification Search
CPC .... G06V 20/188; G06V 10/774; G06V 10/82; G06V 2201/10; G06V 20/10; H04N 5/272
See application file for complete search history.

(56) References Cited

U.S. PATENT DOCUMENTS

2019/0018847 A1   6/2019  Gonzales et al.
2020/0117897 A1*  4/2020  Froloff .................. G06N 20/20

FOREIGN PATENT DOCUMENTS

CN        109492541 A  *  3/2019  ......... G06K 9/00657
CN        111193961 A  *  5/2020  ......... G06F 3/04847
WO   WO-2019094266 A1  *  5/2019  ............. A01B 77/00

OTHER PUBLICATIONS

International Search Report and Written Opinion of International Application No. PCT/EP2020/081299 mailed Jan. 12, 2021, 13 pgs.

* cited by examiner

*Primary Examiner* — Xin Jia
(74) *Attorney, Agent, or Firm* — ArentFox Schiff LLP

(57) ABSTRACT

In order to improve early emergence stages discrimination of plants, an early emergence app is proposed based on a neural network optionally with 'attention' mechanisms, which detects the number of plants that opened after sowing and are present in the field. This way the farmer can easily determine, if crop density targets are met at an early stage after sowing and optionally receive recommendations on catch crop.

15 Claims, 9 Drawing Sheets

SCOUTING FUNCTIONALITY EMERGENCE

CROSS-REFERENCE TO RELATED APPLICATIONS

This application is a national stage entry under 35 U.S.C. § 371 of International Application No. PCT/EP2020/081299, filed on Nov. 6, 2020, which claims the benefit of priority of European Patent Application No. 19208085.1, filed on Nov. 8, 2019, the disclosures of which are hereby incorporated by reference herein in their entireties.

FIELD OF THE INVENTION

The present invention relates to digital farming. In particular, the present invention relates to a decision-support device, a mobile apparatus, an agricultural robot, and a method for crop detection and analysis.

BACKGROUND OF THE INVENTION

Current image recognition apps in the digital farming field focus on the detection of single weed species. In such algorithms, an image of a weed is taken, the image may be sent to a trained convolutional neural network (CNN) and a weed species is determined by the trained CNN. Recently enhanced CNN architectures were proposed that allow object detection networks depending on region proposal algorithms to hypothesize object locations. Region Proposal Network (RPN) that share full-image convolutional features with the detection network enable nearly cost free region proposals.

In agricultural applications, the field environment is challenging for image recognition methods, since multiple plants on different backgrounds may occur in the field. Hence, depending on the image quality and the environment, the algorithmic confidence for crop or weed detection can suffer. Particularly for multiple plants on the image, such algorithms need to discriminate not only plant and environment but also the plant themselves. In particular, for early emergence stages discrimination of plants including crops and weeds is challenging.

US 2019/188847 A1 describes a device that receives images of a field on a farm, and filters the images of the field to generate filtered images. The device uses crop row lines as main factor to identify the crop plants.

SUMMARY OF THE INVENTION

There may be a need to improve early emergence stages discrimination of plants.

The object of the present invention is solved by the subject-matter of the independent claims, wherein further embodiments are incorporated in the dependent claims. It should be noted that the following described aspects of the invention apply also for the decision-support device, the mobile apparatus, the agricultural robot, and the method.

A first aspect of the present invention provides a decision-support device for agricultural object detection. The decision-support device comprises:
an input unit, configured for receiving an image of one or more agricultural objects including at least one crop object in a field;
a computing unit, configured for
i) applying a data driven model to the received image to generate metadata comprising at least one region indicator signifying an image location of the one or more agricultural objects in the received image and an agricultural object label associated with the at least one region indicator,
wherein the data driven model is configured to have been trained with a training dataset comprising multiple sets of examples, each set of examples comprising an example image of one or more agricultural objects in an example field and associated example metadata comprising at least one region indicator signifying an image location of the one or more agricultural objects in the example image and an example agricultural object label associated with the at least one region indicator; and
ii) determining a number of the at least one crop object in the received image and an area of the field the received image covers based on the generated metadata associated with the received image; and
iii) determining a crop density of the at least one crop object based on the number of the at least one crop object in the received image and the area of the field the received image covers;
an output unit, configured for outputting data comprising the determined crop density of the at least one crop object in the field.

In other words, a decision-support device is proposed for recognizing at least one crop object in an image of an agricultural field. The device is based on a data driven model, such as CNN, optionally with 'attention' mechanisms in form of region indicator. The clue here lies in the agricultural region indicator included into the training data of the data driven model. Image background is not important, and no discrimination is required. Such data driven model enables fast and efficient processing even on a mobile device such as a smart phone. On training, images with multiple agricultural objects (e.g., crops, weeds, diseases) are collected and annotated. Once the data driven model is trained and adheres to predefined quality criteria, it will either be made available on a server (cloud) or a mobile device. In the latter case compression may be required, e.g. via node or layer reduction taking out those nodes or layers not triggered that often (in <x % of processed images). With such 'attention' mechanism using region indicator, the decision-support device can differentiate multiple agricultural objects even on different backgrounds in the field. Thus, the efficiency of recognizing multiple agricultural objects including crops can be improved. This enables the detection of the number of plants that opened after sowing and are present in the field. In this way, it is possible to determine the crop density of one or more crop objects. As the image recognition has an improved accuracy, the crop density of the one or more crop objects may be more accurately determined, which may aid the farmer in monitoring early emergence status. As will be explained hereafter, in this way the farmer can easily determine, if crop density targets are met at an early stage after sowing and optionally receive recommendations on catch crop.

The decision-support device is proposed to utilize the visual characteristics of the crop plants to identify them, instead of the planting order (e.g. crop row lines). To separate weed plants from crop plants, the decision-support device may utilize various picture conditions containing different growing conditions. The visual data may be enhanced with augmented reality to measure the absolute distance of the plants. This will be explained in detail hereafter.

According to an embodiment of the present invention, the computing unit is further configured to compare the determined crop density of the at least one crop object with a predefined threshold for the at least one crop object to determine whether a sowing target for the at least one crop object is met.

For example, if the BBCH-scale is used for describing the phenological development of the crop object, the predefined threshold may be 50, 30, or 20 BBCH depending on the crop type. In other words, early emergence means that BBCH is less than 50, 30, or 20 depending on the crop type. For example, for wheat or barley, early emergence may include growth stages less than 20 or 10 BBCH. For beet or corn, early emergence may include growth stages less than 50, 40, 30, or 20 BBCH.

According to an embodiment of the present invention, the computing unit is further configured to provide a warning signal, if it is determined that the sowing target for the at least one crop object is not met.

The warning signal may be a text message, which may be sent to the mobile phone of the farmer. The warning signal may be a voice message.

According to an embodiment of the present invention, the computing unit is configured for applying a catch crop recommendation rule to determine whether catch crop is recommended for the field based on information comprising the crop density of the at least one crop object, type of the at least one crop object, and timing.

A catch crop is a crop grown between two crops in ordinary sequence, between the rows of a main crop, or as a substitute for a staple crop that has failed. The catch crop recommendation rule may be predefined e.g., in a look-up table, which associates the recommendation of catch crop with the crop density of the crop object, crop type, and timing. For example, radishes that mature from seed in 25-30 days can be grown between rows of most vegetables, and harvested long before the main crop matures. Or, a catch crop can be planted between the spring harvest and fall planting of some crops. Alternatively, the catch crop recommendation rule may be defined by a machine learning algorithm, which is trained with historical data including the crop density of the crop object, the crop type, the timing, and the decision of whether a catch crop is recommended.

According to an embodiment of the present invention, the computing unit is configured for applying a predefined growth stage scale to determine a growth stage of the at least one crop object based on at least one feature of the at least one crop object.

An example of the predefined growth stage scale is the BBCH-scale. Other examples of the predefined growth stage scale include Feekes scale, Zadoks scale, etc. The growth stage of the at least one object may be determined e.g., based on leaf size and number of leafs. Based on the growth stage the BBCH may be determined and added as label to each indicator box. The growth stage of the crop may be considered to determine e.g., the growth rate.

According to an embodiment of the present invention, the associated example metadata in each set of examples of the training dataset further comprises an example growth stage label signifying a growth stage of the one or more agricultural objects in the example image. The metadata generated by the data driven model further comprises a growth stage label associated with the at least one region indicator.

In other words, the growth stage may be a further feature the data driven model is trained on, e.g., based on leaf size and number of leafs.

According to an embodiment of the present invention, the computing unit is configured to provide a notification indicating that the at least one crop is not discernible anymore to determine the crop density, if the determined growth stage of the at least one crop object is within a predefined range in the predefined growth stage scale.

For example, the predefined range may be BBCH>50, 30, or 20 depending on the crop type. Thus, if the growth stage is within the predefined range, e.g., BBCH>50, 30, or 20, the computing unit will notify the farmer that the crops are not discernible anymore to determine crop density. The notification may be a text message, a voice message, etc.

According to an embodiment of the present invention, the computing unit is further configured to determine a crop damage due to an extreme weather condition by comparing the determined crop density of the at least one crop object with an expected crop density of the at least one crop object representing a crop density under a normal weather condition. The output on crop density further includes a difference indicator signifying the determined crop damage.

For example, the computing unit may determine crop damages due to cold periods, e.g., winter season, or drought periods. In such a case, the previous results may be stored and the output on crop density may include a difference indicator signifying the relative or absolute loss. The time window may be related to weather data to detect extreme weather conditions and appropriate images may be chosen.

According to an embodiment of the present invention, the computing unit is configured to determine the crop density for the at least one crop object in multiple fields. The computing unit is configured for determining a threshold for target density classification based on the determined crop density for the at least one crop object in the multiple fields, tagging different locations with results from the receive images on crop density, and/or comparing results of from different farmers in a similar region.

Including results from multiple fields and regions may allow to implement a radar like or community functionality. Different locations may be tagged with results from images on crop density. Results from different farmers may aid to determine thresholds for target density classification. Results from different farmers in similar region may also be compared and crop density may be put in perspective with respective to other users.

According to an embodiment of the present invention, the decision-support device comprises a web server unit, configured for interfacing with a user via a webpage and/or an application program served by the web server. The decision-support device is configured for providing a graphical user interface, GUI, to a user, by the webpage and/or the application program such that the user can provide an image of one or more agricultural objects in a field to the decision-support device and receive data comprising a determined crop density of at least one crop object in the field.

In other words, the decision-support device may be a remote server that provides a web service to facilitate agricultural object detection in a field. The remote server may have a more powerful computing power to provide the service to multiple users to perform agricultural object detection in many different fields. The remote server may include an interface through which a user can authenticate (e.g. by providing a username and password), and use this interface to upload an image captured in a field to the remote server for performing analysis and receive associated metadata from the remote server.

A second aspect of the present invention provides a mobile apparatus, comprising:
 a camera, configured for capturing an image of one or more agricultural objects including at least one crop object in a field;
 a processing unit, configured for:

i) being a decision-support device as described above and below for providing a determined crop density of at least one crop object in the field; and/or ii) providing a graphical user interface, GUI, to a user, via a webpage and/or an application program served by a decision-support device as described above and below to allow the user to provide the captured image to the decision-support device and to receive a determined crop density of at least one crop object in the field from the decision-support device; and a display, configured for displaying the captured image and the determined crop density of the at least one crop object in the field.

In other words, the data driven model may be made available on a server (cloud). In this case, the mobile apparatus, e.g. mobile phone or tablet computer, takes an image of an area of a field with its camera, the image is then sent to the decision-support device configured to be a remote server, and one or more agricultural objects are identified by the remote server and the crop density of one or more crops is determined. The corresponding results are sent to the mobile apparatus for being displayed to the user. Alternatively or additionally, the data driven model may be made available to the mobile apparatus. In this case compression may be required, e.g. via node or layer reduction taking out those nodes or layers not triggered that often (in <x % of processed images).

According to an embodiment of the present invention, the processing unit is further configured for overlaying the at least one region indicator on the associated one or more agriculture objects in the captured image, preferably with the associated agricultural object label.

According to an embodiment of the present invention, the processing unit is further configured for producing an augmented reality image of a field environment that comprises one or more agricultural objects, each agricultural object being associated with a respective agricultural object label and the determined overlaid on the augmented reality image.

A third aspect of the present invention provides an agricultural robot, comprising:

an interface unit;
an control unit; and
one or more treatment tools;
wherein the interface unit is configured to receive an output from a decision-support device as described above and below; and
wherein the control unit is configured to control the one or more treatment tools to receive configured to perform one or more in-season management tasks in accordance with the received output from the decision-support device.

Examples of the agricultural robot include, but not limited to, vehicles or drones. In some examples, the one or more treatment tools may comprise means for delivering materials such as pesticides, seeds, fertilizer, and the like to the field and plants being farmed. In some examples, the one or more treatment tools may comprise mechanical means, such as end effector, manipulator, or gripper, for performing one or more management tasks.

A fourth aspect of the present invention provides a method for agricultural object detection, comprising:

a) receiving an image of one or more agricultural objects including at least one crop object in a field;

b) applying a data driven model to the received image to the received image to generate metadata comprising at least one region indicator signifying an image location of the one or more agricultural objects in the received image and an agricultural object label associated with the at least one region indicator, wherein the data driven model is configured to have been trained with a training dataset comprising multiple sets of examples, each set of examples comprising an example image of one or more agricultural objects in an example field and associated example metadata comprising at least one region indicator signifying an image location of the one or more agricultural objects in the example image and an example agricultural object label associated with the at least one region indicator;

c) determining the number of the at least one crop object in the received image and an area of the field the received image covers based on the generated metadata associated with the received image;

d) determining a crop density of the at least one crop object based on the number of the at least one crop object in the received image and the area of the field the received image covers; and e) outputting data comprising the determined crop density of the at least one crop object in the field.

As used herein, the term "data driven model" may refer to a mathematical model, or algorithm, that can identify what is the output based on having "seen" a large number of examples of input/output pairs and "training" it to get to the right output. Examples of the data driven model may include e.g., deep neural networks, deep belief networks, recurrent neural networks, convolutional neural networks, etc.

As used herein, the term "early emergence" may refer to BBCH<50, 30 or 20 depending on the crop type. For example, for wheat or barley early emergence may include growth stage<20 or 10 BBCH. For beet or corn early emergence may include growth stages<50, 40, 30 or 20 BBCH. The threshold for early emergency may be determined based on historical data or set by an operator.

As used herein, the term "unit" may refer to, be part of, or include an ASIC, an electronic circuit, a processor (shared, dedicated, or group) and/or memory (shared, dedicated, or group) that execute one or more software or firmware programs, a combinational logical circuit, and/or other suitable components that provide the described functionality.

These and other aspects of the present invention will become apparent from and be elucidated with reference to the embodiments described hereinafter.

BRIEF DESCRIPTION OF THE DRAWINGS

These and other aspects of the invention will be apparent from and elucidated further with reference to the embodiments described by way of examples in the following description and with reference to the accompanying drawings, in which FIG. 1 schematically shows an example of a decision-support device for agricultural objection detection.

Figure 1:
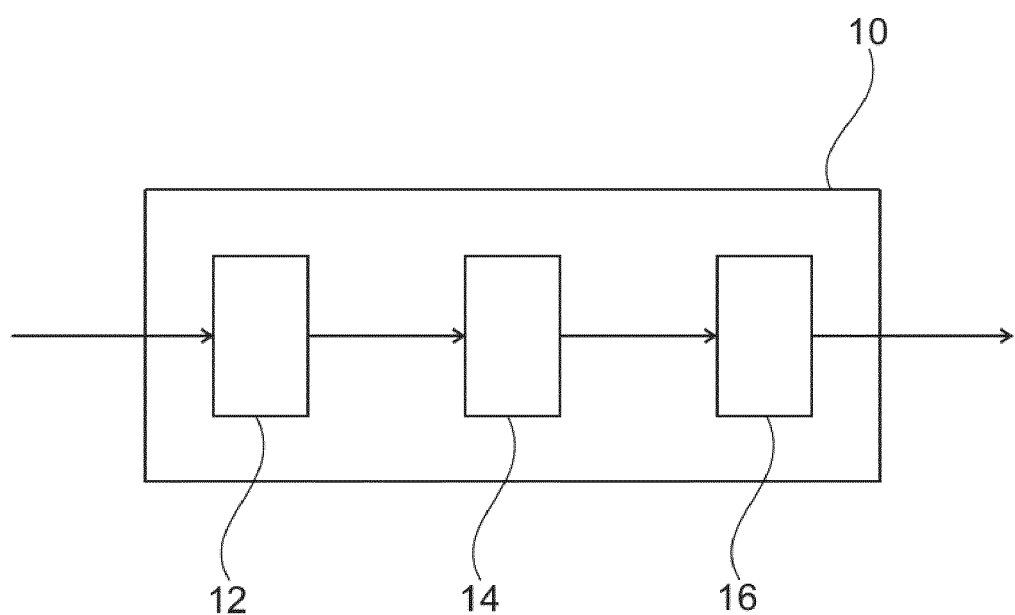

It should be noted that the figures are purely diagrammatic and not drawn to scale. In the figures, elements which correspond to elements already described may have the same reference numerals. Examples, embodiments or optional features, whether indicated as non-limiting or not, are not to be understood as limiting the invention as claimed.

DETAILED DESCRIPTION OF EMBODIMENTS

FIG. 1 schematically shows a decision-support device 10. The decision-support device 10 comprises an input unit 12, a computing unit 14, and an output unit 16.

The input unit 12 is configured for receiving an image of one or more agricultural objects in a field. Examples of the agricultural objects may include, but not limited to, crops, weeds, leaf damages, diseases, and a nitrogen deficiency. The one or more agricultural objects comprises at least one crop object in a field.

The decision-support device 10 may provide an interface, e.g., via a webpage and/or an application program (also referred to as app) that instructs a user to capture an image of a field. The interface may let a user to specify the crop before taking a picture. If the crop was not specified before processing, the image(s) may be analyzed for plant rows. Based on such analysis, plants of one type detected to be in a row may be assigned as crop. The most likely plant(s) that could be crop may be provided to the farmer for selection. The remaining plants in the image may be classified as weed. The number of crops may be determined based on the output of the data driven model.

Figure 2A:
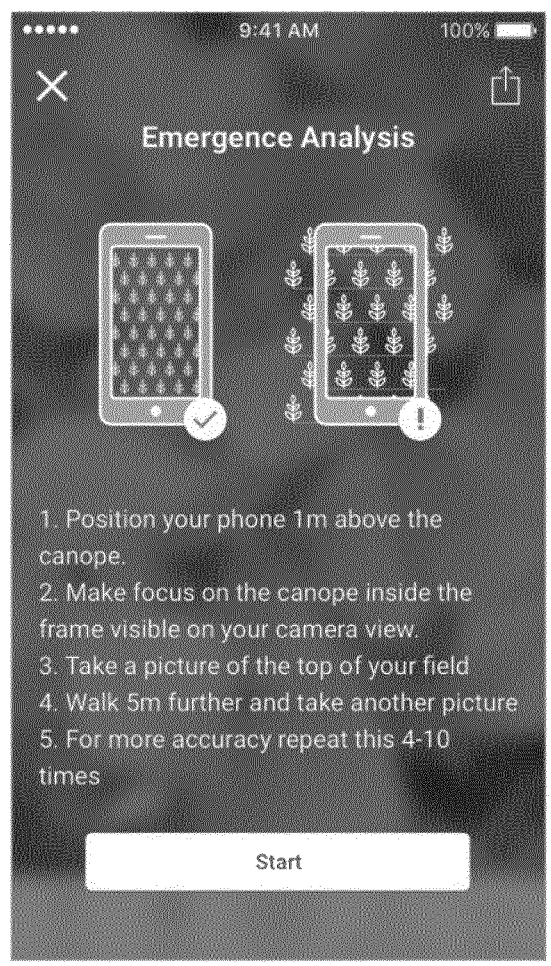
FIG. 2A shows an example of a graphical user interface (GUI) provided by the decision-support device.

FIG. 2A shows an example of a graphical user interface (GUI) provided by the decision-support device, which guides the user to capture one or more images of the canope in the field with a mobile phone with the following exemplary steps:
1. Position your phone 1 m above the canope.
2. Make focus on the canope inside the frame visible on your camera view.
3. Take a picture of the top of your field.
4. Walk 5 m further and take another picture.
5. For more accuracy repeat this 4-10 times.

Figure 2B:
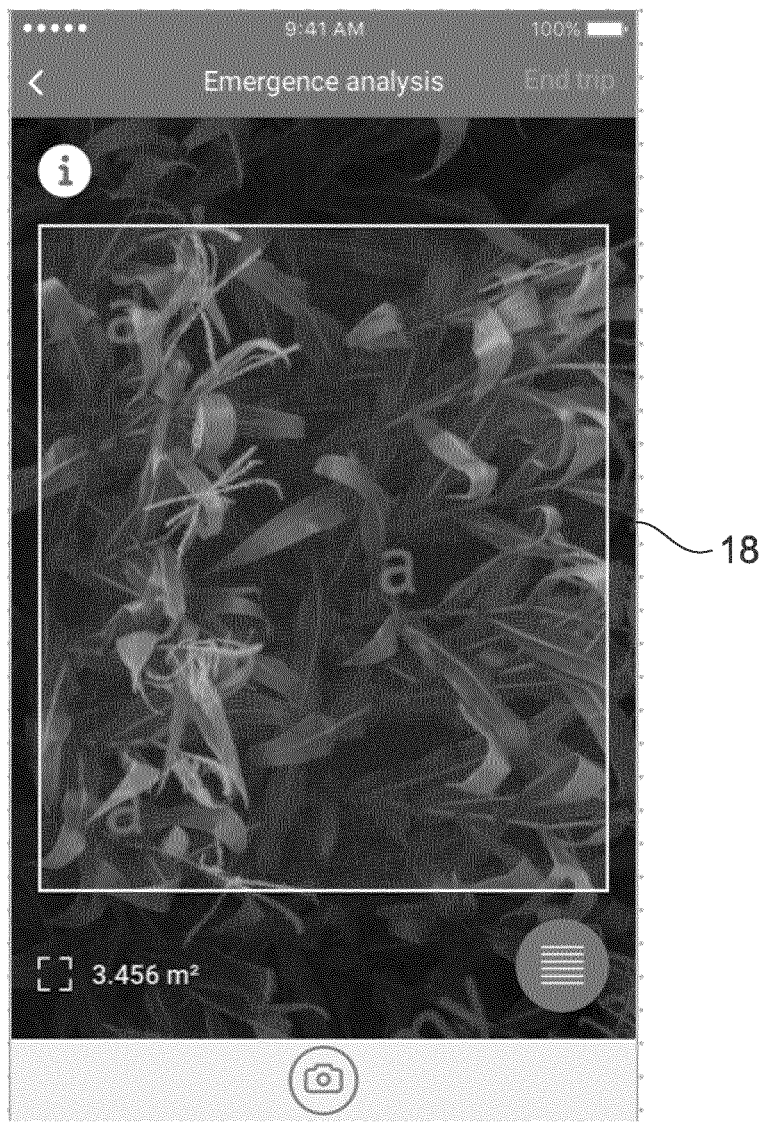
FIG. 2B shows an example of a screenshot of an image captured by a mobile phone.
Figure 2C:
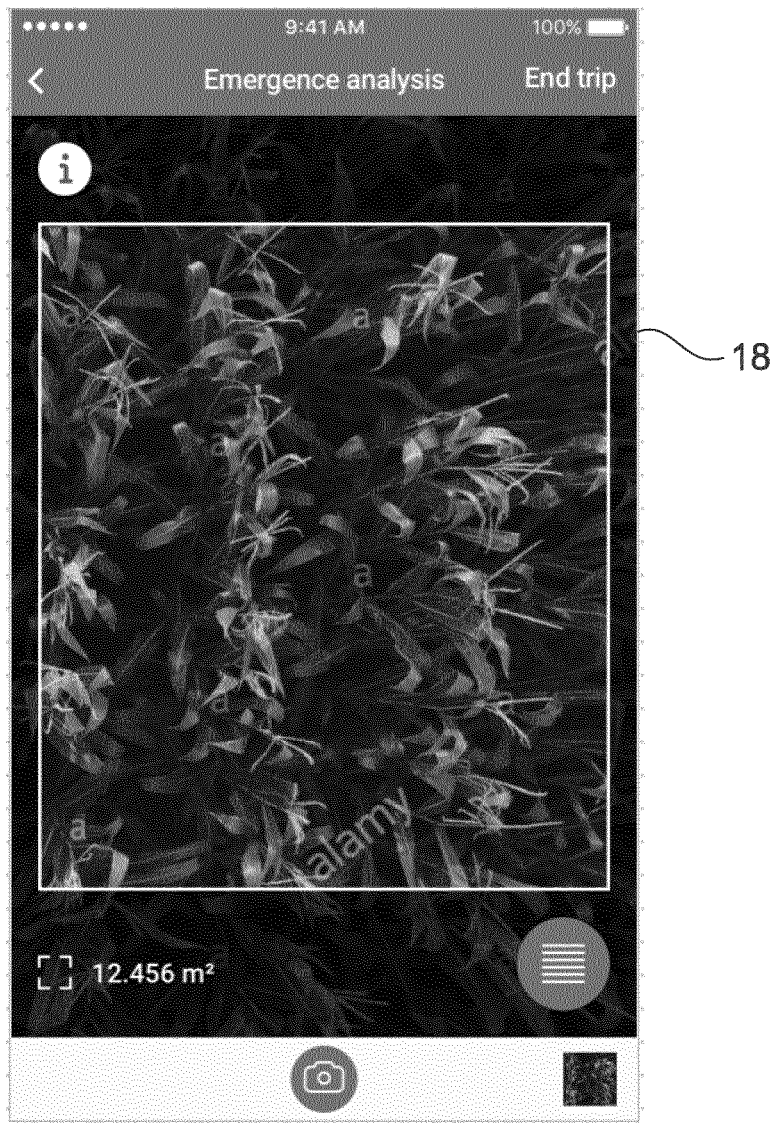
FIG. 2C shows a further example of a screenshot of an image captured by a mobile phone.

An example of the photo is illustrated in FIG. 2B, which shows an example of a screenshot of an image 18 captured by a mobile phone. A further example of the photo is illustrated in FIG. 2C, which shows an example of a screenshot of an image 18 including images of different areas in the field taken via the camera of the mobile phone.

Returning to FIG. 1, the computing unit 14 is configured for applying a data driven model to the received image to generate metadata comprising at least one region indicator signifying an image location of the one or more agricultural objects in the received image and an agricultural object label associated with the at least one region indicator. The data driven model is configured to have been trained with a training dataset comprising multiple sets of examples, each set of examples comprising an example image of one or more agricultural objects in an example field and associated example metadata comprising at least one region indicator signifying an image location of the one or more agricultural objects in the example image and an example agricultural object label associated with the at least one region indicator. On training images with multiple plants including weed and crop are collected and annotated. The annotation includes region indicator in form of a rectangular box marking each plant and respective plant species surrounded by the box. The annotated data is separated into a training data and test data set. To enable appropriate testing of the trained network, the test data has to cover different plant species, ideally all plant species the network is trained upon. A quality report in the test data results will include the quality in terms of confidence. Apart from region indicator and species the data driven model may also be trained on growth stage. An additional data driven model may be trained to recognize crops in the image.

Figure 3:
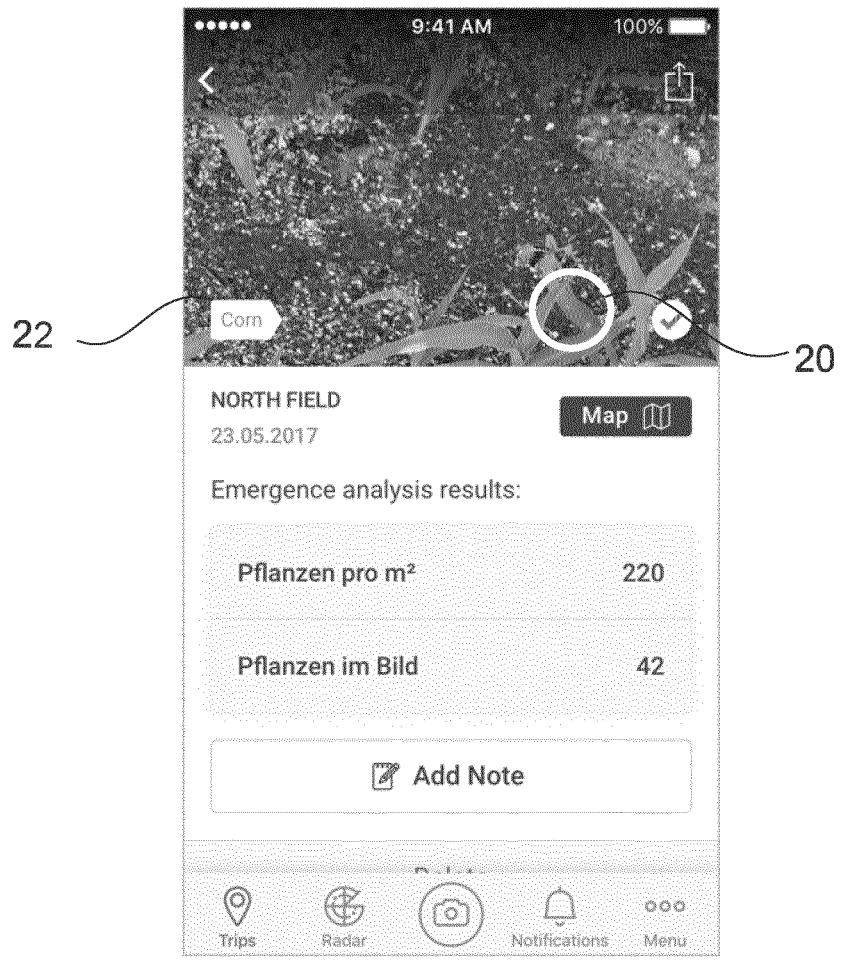
FIG. 3 shows an example of analysis results.

In the example of the photo in FIG. 3, one region indicator 20 is identified and overlaid on the original input image. The region indicator is displayed including a label 22. In the example of FIG. 3, the region indicator 20 is displayed as circles around each recognized agriculture object. The region indicator 20 may be marked with a color-coded indicator. The label 22 in the example of FIG. 3, show the name of the crop object, i.e. corn.

Optionally, the image may be checked on a coarse basis to filter junk (e.g. Coca Cola bottle) from field images. Additional quality criteria may be checked such as image size, resolution, brightness, blurriness, sharpness, focus and so on. Once the image passed the quality check it is fed to the input layer of the trained neural network.

Optionally, on the output layer region indicators for each detected plant and respective labels including confidence level may be provided. The confidence level attached to each label multiple labels may be displayed (not shown). E.g. if the highest confidence level on one box label is >50% this will be displayed. Top 2 (e.g. >40%) or 3 (e.g. >30%) labels according to confidence level may also be displayed to the user. Region indicators may be displayed as box around each weed/crop or a center point of the box may be marked with a color-coded indicator. For each indicator a drop list may be lodged which pops open on a touch screen tapping gesture by the user. Depending on output the user may either confirm the crop/weed species with highest or lower confidence rank. Alternatively, the user may correct the crop/weed species.

Returning to FIG. 1, the computing unit 14 is further configured for determining a number of the at least one crop object in the received image and an area of the field the received image covers based on the generated metadata associated with the received image. In the example of the photo in FIG. 3, the number of corn in the image and the area of the field the received image covers are calculated and displayed. Based on the number of the at least one crop object in the received image and the area of the field the receive image covers, the computing unit 14 is further configured for determining a crop density of the at least one crop object.

Returning to FIG. 1, the output unit 16 is configured for outputting data comprising the determined crop density of the at least one crop object in the field.

Optionally, the computing unit 14 may be further configured to compare the determined crop density of the at least one crop object with a predefined threshold for the at least one crop object to determine whether a sowing target for the at least one crop object is met. As a further option, the computing unit 14 may be further configured to provide a warning signal, if it is determined that the sowing target for the at least one crop object is not met. As a further option, the computing unit 14 may be further configured to apply a predefined catch crop recommendation rule to determine whether catch crop is recommended for the field based on Information comprising the crop density of the at least one crop object, type of the at least one crop object, and timing. In other words, together with the recognized crop from the data driven model a crop density may be determined, i.e. it may be determined how many plants are present per square meter. If more than one image was taken and analysed the mean of all images may be taken. Crop density can be used to further determine, if the sowing target is met, e.g. if a first threshold is exceeded. If the sowing target is not met, e.g. if a second threshold is not exceeded, an early warning or notification may be issued to the farmer. Additionally catch up fruit may be recommended.

Optionally, the computing unit 14 may be further configured for applying a predefined growth stage scale to determine a growth stage of the at least one crop object based on at least one feature of the at least one crop object. The growth stage of the crop may be considered to determine e.g. the growth rate. As a further option, the associated example metadata in each set of examples of the training dataset further comprises an example growth stage label signifying a growth stage of the one or more agricultural objects in the example image. The metadata generated by the data driven model further comprises a growth stage label associated with the at least one region indicator. In other words, the growth stage may be a further feature the data driven model is trained on, e.g. based on leaf size and no. of leafs. Based on the growth stage the BBCH may be determined and added as label to each indicator box. If the growth stage exceeds a threshold, e.g. 50 or 30 BBCH, the computing unit will notify the farmer, e.g., via the GUI of a webpage or an application program, that the crops are not discernible anymore to determine crop density.

Optionally, the computing unit 14 is further configured to determine a crop damage due to an extreme weather condition by comparing the determined crop density of the at least one crop object with an expected crop density of the at least one crop object representing a crop density under a normal weather condition. The output on crop density further includes a difference indicator signifying the determined crop damage. For example, the computing unit may also be used to determine crop damages due to cold periods, e.g. winter season, or drought periods. In such a case the previous results may be stored and the output on crop density may include a difference indicator signifying the relative or absolute loss. The time window may be related to weather data to detect extreme weather conditions and appropriate images may be chosen.

Optionally, the computing unit 14 is configured to determine the crop density for the at least one crop object in multiple fields. The computing unit is configured for determining a threshold for target density classification based on the determined crop density for the at least one crop object in the multiple fields, tagging different locations with results from the receive images on crop density, and/or comparing results of from different farmers in a similar region. For example, different locations may be tagged with results from images on crop density. Results from different farmers may aid to determine thresholds for target density classification. Results from different farmers in similar region may also be compared and crop density may be put in perspective with respect to other users. Results from multiple fields and regions may allow to implement a radar like or community functionality.

The decision-support device 10 may be embodied as, or in, a mobile apparatus, such as a mobile phone or a tablet computer. Alternatively, the decision-support device may be embodied as a server that communicatively coupled to a mobile apparatus for receiving the image and outputting an analysis result to a mobile device. For example the decision-support device may have a web server unit configured for interfacing with a user via a webpage and/or an application program served by the web server. The decision-support device is configured to provide a graphical user interface, GUI, to a user, by the webpage and/or the application program such that the user can provide an image of one or more agricultural objects in a field to the decision-support device and receive metadata associated with the image from the decision-support device. Thus, once the data driven model is trained and adheres to predefined quality criteria, it will either be made available on a server, e.g., cloud, or a mobile device. In the latter case compression may be required, e.g. via node or layer reduction taking out those nodes or layers not triggered that often (in <x % of processed images).

The decision-support device 10 may comprise one or more microprocessors or computer processors, which execute appropriate software. The processor of the device may be embodied by one or more of these processors. The software may have been downloaded and/or stored in a corresponding memory, e.g. a volatile memory such as RAM or a non-volatile memory such as flash. The software may comprise instructions configuring the one or more processors to perform the functions described with reference to the processor of the device. Alternatively, the functional units of the device, e.g., the computing unit, may be implemented in the device or apparatus in the form of programmable logic, e.g., as a Field-Programmable Gate Array (FPGA). In general, each functional unit of the system may be implemented in the form of a circuit. It is noted that the decision-support device 10 may also be implemented in a distributed manner, e.g. involving different devices or apparatuses.

Figure 4:
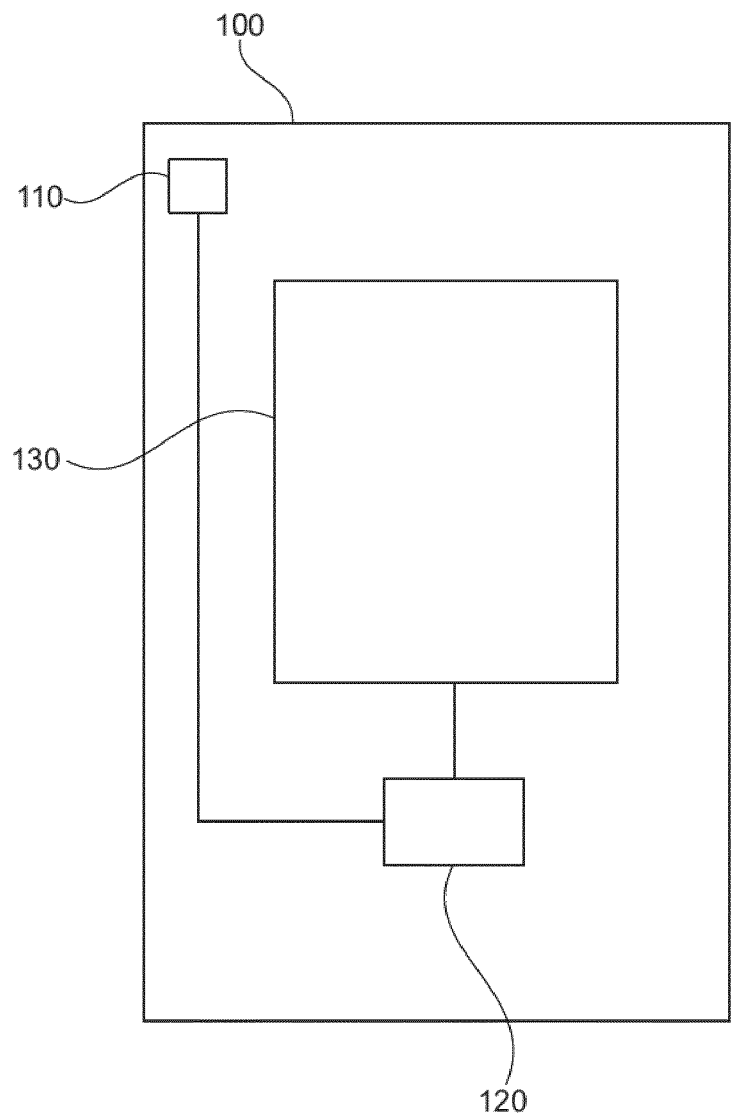
FIG. 4 schematically shows an example of a mobile apparatus.

FIG. 4 schematically shows a mobile apparatus 100, which may be e.g., a mobile phone or a tablet computer. The mobile apparatus 100 comprises a camera 110, a processing unit 120, and a display 130.

The camera 110 is configured for capturing an image of one or more agricultural objects in a field.

The processing unit 120 is configured for being a decision-support device as describe above and below. In other words, the data driven model may be made available on the mobile apparatus. The compression may be required, e.g. via node or layer reduction taking out those nodes or layers not triggered that often (in <x % of processed images). Optionally, the processing unit 120 is further configured for overlaying the at least one region indicator on the associated one or more agriculture objects in the captured image, preferably with the associated agricultural object label. An example of the overlaid image is illustrated in FIG. 3.

The display 130, such as a touch screen, is configured for displaying the captured image and the associated metadata.

Figure 5:
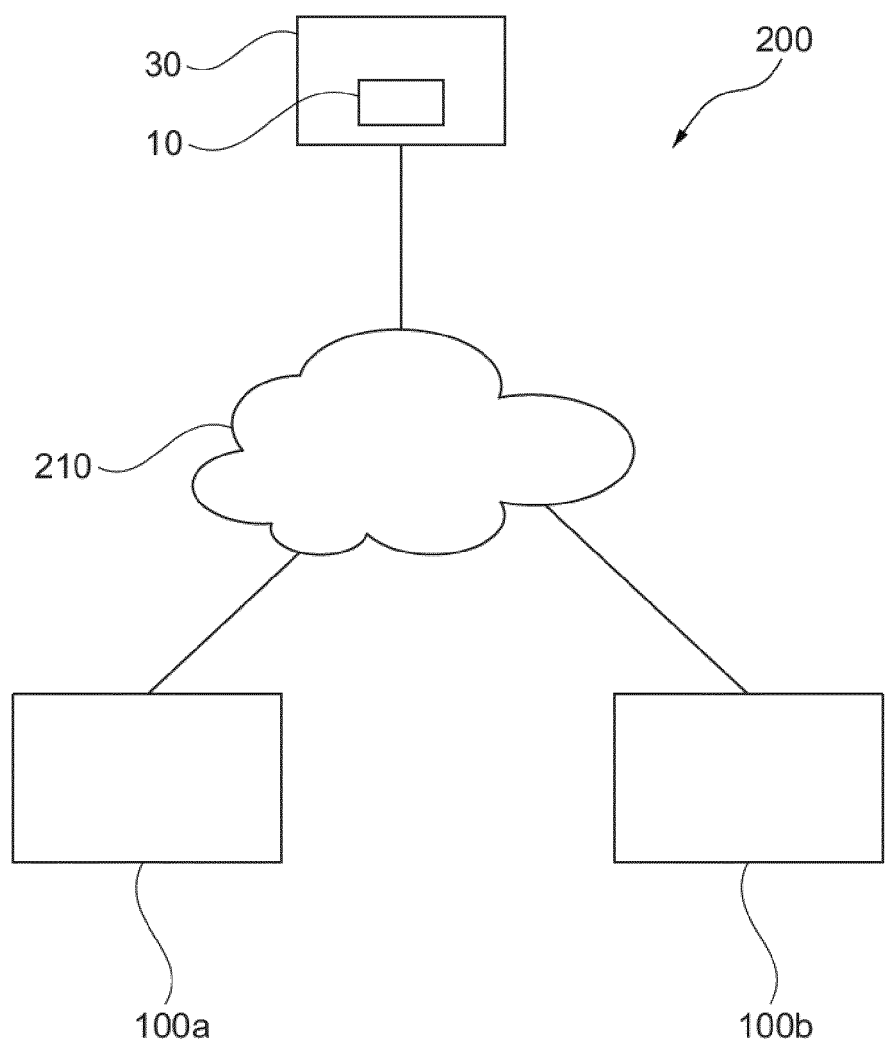
FIG. 5 schematically shows a further example of a mobile apparatus.

Additionally or alternatively, the data support device 10 may be embodied as a remote server as shown in FIG. 5 in a system 200. The system 200 of the illustrated example comprises a plurality of mobile apparatus 100, such as mobile apparatuses 100a, 100b, a network 210, and a decision-support device 10. For simplicity, only two mobile apparatuses 100a, 100b are illustrated. However, the following discussion is also scalable to a large number of mobile apparatuses.

The mobile apparatuses 100a, 100b of the illustrated example may be a mobile phone, a smart phone and/or a tablet computer. In some embodiments, the mobile apparatuses 100a, 100b may also be referred to as clients. Each mobile apparatus 100a, 100b may comprise a user interface like a touch screen configured to facilitate one or more users to submit one or more images captured in the field to the decision-support device. The user interface may be an interactive interface including, but not limited to, a GUI, a character user interface and a touch screen interface.

The decision-support device 10 may have a web server unit 30 that provides a web service to facilitate management of image data in the plurality of mobile apparatuses 100*a*, 100*b*. In some embodiments, the web server unit 30 may interface with users e.g. via webpages, desktop apps, mobile apps to facilitate the user to access the decision-support device 10 to upload captured images and receive associated metadata. Alternatively, the web server unit 30 of the illustrated example may be replaced with another device (e.g. another electronic communication device) that provides any type of interface (e.g. a command line interface, a graphical user interface). The web server unit 30 may also include an interface through which a user can authenticate (by providing a username and password).

The network 210 of the illustrated example communicatively couples the plurality of mobile apparatuses 100*a*, 100*b*. In some embodiments, the network 210 may be the internet. Alternatively, the network 210 may be any other type and number of networks. For example, the network 210 may be implemented by several local area networks connected to a wide area network. Of course, any other configuration and topology may be utilized to implemented the network 210, including any combination of wired network, wireless networks, wide area networks, local area networks, etc.

The decision-support device 10 may analyze the image submitted from each mobile apparatus 100*a*, 100*b* and return the analysis results to the respective mobile apparatus 100*a*, 100*b*.

Optionally, the processing unit 120 of the mobile apparatus may be further configured for performing a quality check on the captured image before providing the captured image to the decision-support device. The quality check comprises checking at least one of an image size, a resolution of the image, a brightness of the image, a blurriness of the image, a sharpness of the image, a focus of the image, and filtering junk from the captured image.

Optionally, the processing unit 120 is further configured for producing an augmented reality image of a field environment that comprises one or more agricultural objects, each agricultural object being associated with a respective agricultural object label and preferably a respective region indicator overlaid on the augmented reality image. For example, the emergence recognition may be implemented as an online/real-time functionality in combination with the augmented reality. Hence the mobile phone camera is used to produce an augmented reality image of the field environment, the neural network processes each image of the sequence and the recognized labels and optionally region indicators are overlaid on the augmented reality image. This may allow to enhance the applicability of crop detection augmented reality and two-dimensional area measurements may be used.

Examples of algorithms to enable augmented reality and area measurements include, but not limited to:
Marker-less AR: Key algorithms include visual odometry and visual-inertial odometry.
Marker-less AR with geometric environment understanding: Here, in addition to localizing the camera, a dense 3D reconstruction of the environment is provided. Key algorithms include dense 3D reconstruction, multi-view stereo literature.
Marker-less AR with geometric and semantic environment understanding: Here, in addition to having a dense 3D reconstruction, labels for those surfaces are provided.

Key algorithms are semantic segmentation, object detection, 3D object localization. Augmented reality may be used to render the detected plants, including labels and so on. Additionally, a meter function may be used to determine an area marked in the image. The marked area may be entered by the user to cover the plants shown in the image e.g. by tapping four corners. Alternatively based on the region indicators a marked area may be suggested to the user, who can correct. Based on the marked image area and optionally the camera optics specification the real area may be determined.

Figure 6:
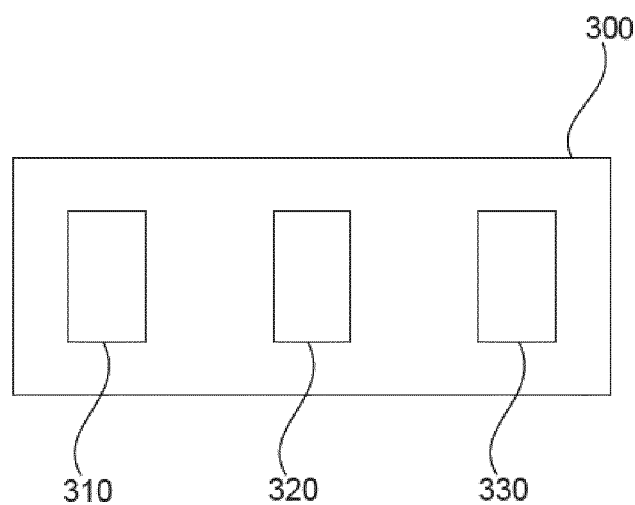
FIG. 6 schematically shows an example of an agricultural robot.

FIG. 6 schematically illustrates an example of an agricultural robot 300. The agricultural robot 300 may be a vehicle-based robot or a drone-based robot. The agricultural robot may have a navigation system, e.g., vision-based or GPS-based, for navigating the agricultural robot to a desired location in the field for performing one or more management tasks.

The agricultural robot comprises an interface unit 310, a control unit 320, and one or more treatment tools 330.

The interface unit 310 is configured to receive an output from a decision-support device as described above and below, e.g., via a physical cable or wirelessly.

The control unit 320 is configured to control the one or more treatment tools 330 to perform one or more in-season management tasks in accordance with the received output from the decision-support device. The one or more treatment tools 330 may comprises means, e.g., spray nozzles, for delivering materials such as pesticides, seeds, fertilizer, and the like to the field and plants being farmed. In some examples, the one or more treatment tools may comprise mechanical means, such as end effector, manipulator, or gripper, for performing one or more management tasks. For example, the end effector in an agricultural robot is the device found at the end of the robotic arm, which may be used for harvesting, spraying, and bagging. The gripper is a grasping device that is used for harvesting the target crop. The manipulator allows the gripper and end effector to navigate through their environment. One of the in-season management tasks may be planting a catch crop in response to the recommendation of catch crop for the field.

Figure 7:
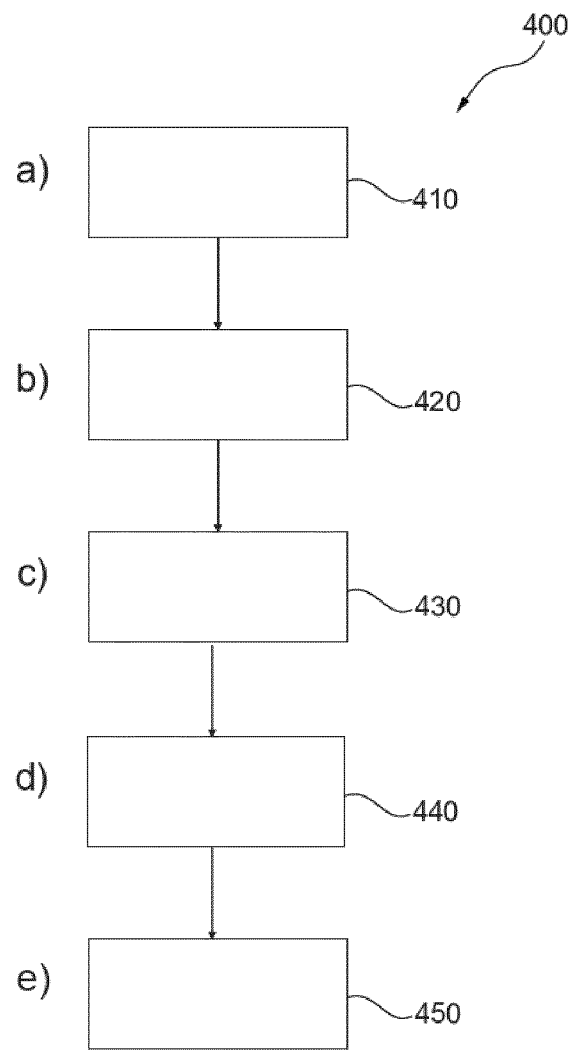
FIG. 7 shows a flow chart illustrating a method for crop detection and analysis.

FIG. 7 shows a flow chart illustrating a method 400 for agricultural object detection. In step 410, i.e. step a), an image of one or more agricultural objects including at least one crop object in a field is received. For example, a mobile phone camera may capture an image of multiple crops and weeds in an area of the field.

In step 420, i.e. step b), a data driven model is applied to the received image to create metadata comprising at least one region indicator signifying an image location of the one or more agricultural objects in the received image and an agricultural object label associated with the at least one region indicator. The data driven model is configured to have been trained with a training dataset comprising multiple sets of examples, each set of examples comprising an example image of one or more agricultural objects in an example field and associated example metadata comprising at least one region indicator signifying an image location of the one or more agricultural objects in the example image and an example agricultural object label associated with the at least one region indicator.

In step 430, i.e. step c), the number of the at least one crop object in the received image and an area of the field the received image covers are determined based on the generated metadata associated with the received image.

In step 440, i.e. step d), a crop density of the at least one crop object is determined based on the number of the at least one crop object in the received image and the area of the field the received image covers.

In step 450, i.e. step e), data comprising the determined crop density of the at least one crop object in the field is output, e.g. displayed on the mobile phone.

It will be appreciated that the above operation may be performed in any suitable order, e.g., consecutively, simultaneously, or a combination thereof, subject to, where applicable, a particular order being necessitated, e.g., by input/output relations.

In another exemplary embodiment of the present invention, a computer program or a computer program element is provided that is characterized by being adapted to execute the method steps of the method according to one of the preceding embodiments, on an appropriate system. The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims. In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A decision-support device (10) for crop detection, comprising:
an input unit (14), configured for receiving an image of one or more agricultural objects including at least one crop object in a field;
a computing unit (14), configured for
i) applying a data driven model to the received image to generate metadata comprising at least one region indicator signifying an image location of the one or more agricultural objects in the received image and an agricultural object label associated with the at least one region indicator,
   wherein the data driven model is configured to have been trained with a training dataset comprising multiple sets of examples, each set of examples comprising an example image of one or more agricultural objects in an example field and associated example metadata comprising at least one region indicator signifying an image location of the one or more agricultural objects in the example image and an example agricultural object label associated with the at least one region indicator; and
ii) determining a number of the at least one crop object in the received image and an area of the field the received image covers based on the generated metadata associated with the received image; and
iii) determining a crop density of the at least one crop object based on the number of the at least one crop object in the received image and the area of the field the received image covers;
an output unit (16), configured for outputting data comprising the determined crop density of the at least one crop object in the field.

2. Decision-support device according to claim 1,
wherein the computing unit is further configured to compare the determined crop density of the at least one crop object with a predefined threshold for the at least one crop object to determine whether a sowing target for the at least one crop object is met.

3. Decision-support device according to claim 2,
wherein the computing unit is further configured to provide a warning signal, if it is determined that the sowing target for the at least one crop object is not met.

4. Decision-support device according to claim 2,
wherein the computing unit is configured for applying a predefined catch crop recommendation rule to determine whether catch crop is recommended for the field based on information comprising the crop density of the at least one crop object, type of the at least one crop object, and timing.

5. Decision-support device according to claim 1, wherein the computing unit is configured for applying a predefined growth stage scale to determine a growth stage of the at least one crop object based on at least one feature of the at least one crop object.

6. Decision-support device according to claim 5, wherein the associated example metadata in each set of examples of the training dataset further comprises an example growth stage label signifying a growth stage of the one or more agricultural objects in the example image; and
wherein the metadata generated by the data driven model further comprises a growth stage label associated with the at least one region indicator.

7. Decision-support device according to claim 5, wherein the computing unit is configured to provide a notification indicating that the at least one crop is not discernible anymore to determine the crop density, if the determined growth stage of the at least one crop object is within a predefined range in the predefined growth stage scale.

8. Decision-support device according to claim 1, wherein the computing unit is further configured to determine a crop damage due to an extreme weather condition by comparing the determined crop density of the at least one crop object with an expected crop density of the at least one crop object representing a crop density under a normal weather condition; and
wherein the output on crop density further includes a difference indicator signifying the determined crop damage.

9. Decision-support device according to claim 1, wherein the computing unit is configured to determine the crop density for the at least one crop object in multiple fields; and
wherein the computing unit is configured for:
determining a threshold for target density classification based on the determined crop density for the at least one crop object in the multiple fields;
tagging different locations with results from the receive images on crop density; and/or
comparing results of from different farmers in a similar region.

10. Decision-support device according to claim 1, further comprising:
a web server unit, configured for interfacing with a user via a webpage and/or an application program served by the web server; and
wherein the decision-support device is configured for providing a graphical user interface, GUI, to a user, by the webpage and/or the application program such that the user can provide an image of one or more agricultural objects in a field to the decision-support device and receive data comprising a determined crop density of at least one crop object in the field.

11. A mobile apparatus (100), comprising:
a camera (110), configured for capturing an image of one or more agricultural objects including at least one crop object in a field;
a processing unit (120), configured for:
i) being a decision-support device according to claim 1 for providing a determined crop density of at least one crop object in the field; and/or
ii) providing a graphical user interface, GUI, to a user, via a webpage and/or an application program served by the decision-support device to allow the user to provide the captured image to the decision-support device and to receive a determined crop density of at least one crop object in the field from the decision-support device; and
a display (130), configured for displaying the captured image and the determined crop density of the at least one crop object in the field.

12. Mobile apparatus according to claim 11, wherein the processing unit is further configured for overlaying the at least one region indicator on the associated one or more agriculture objects in the captured image, preferably with the associated agricultural object label.

13. Mobile apparatus according to claim 11, wherein the processing unit is further configured for producing an augmented reality image of a field environment that comprises one or more agricultural objects, each agricultural object being associated with a respective agricultural object label and the determined overlaid on the augmented reality image.

14. An agricultural robot (300), comprising:
an interface unit (310);
an control unit (320); and
one or more treatment tools (330);
wherein the interface unit is configured to receive an output from a decision-support device according to claim 1; and
wherein the control unit is configured to control the one or more treatment tools to receive configured to perform one or more in-season management tasks in accordance with the received output from the decision-support device.

15. A method (400) for crop detection, comprising:
a) receiving (410) an image of one or more agricultural objects including at least one crop object in a field;
b) applying (420) a data driven model to the received image to the received image to generate metadata comprising at least one region indicator signifying an image location of the one or more agricultural objects in the received image and an agricultural object label associated with the at least one region indicator,
wherein the data driven model is configured to have been trained with a training dataset comprising multiple sets of examples, each set of examples comprising an example image of one or more agricultural objects in an example field and associated example metadata comprising at least one region indicator signifying an image location of the one or more agricultural objects in the example image and an example agricultural object label associated with the at least one region indicator;
c) determining (430) the number of the at least one crop object in the received image and an area of the field the received image covers based on the generated metadata associated with the received image;
d) determining a crop density of the at least one crop object based on the number of the at least one crop object in the received image and the area of the field the received image covers; and
e) outputting data comprising the determined crop density of the at least one crop object in the field.

* * * * *